Patented May 14, 1929.

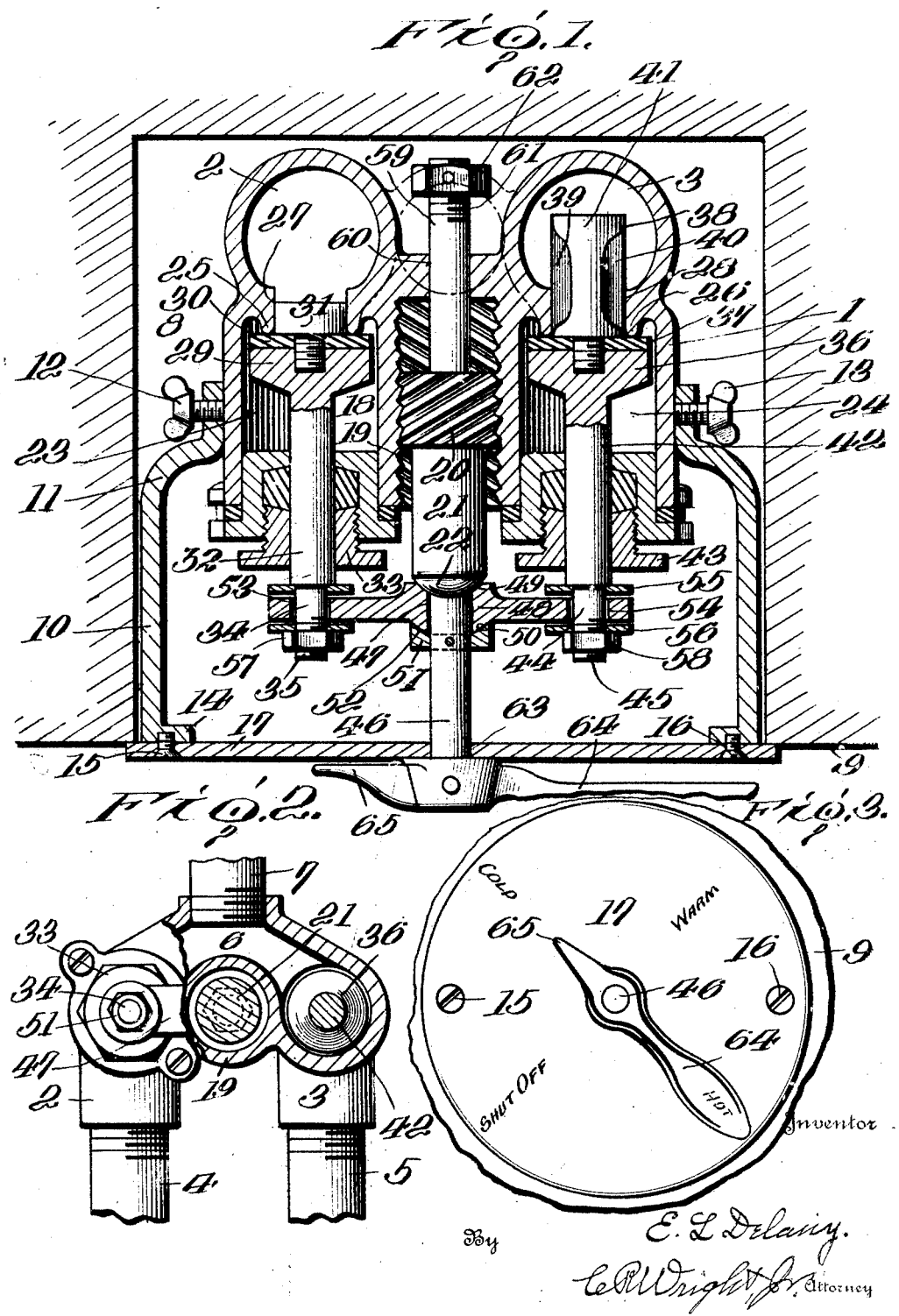

1,713,033

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

MIXING VALVE.

Application filed January 17, 1925. Serial No. 3,126.

My invention relates to improvements in mixing valves.

The object of my invention is to provide a mixing valve particularly adapted for bath purposes, whereby either cold, warm or hot water can be drawn from a single spigot operated by a single lever, and provide a valve whereby it is impossible to turn on scalding water upon the first part of the movement of the operating lever.

Another object of my invention is to provide a valve of this character adapted more particularly for shower baths, in which the valves are arranged within a recess in the wall above the tub, and providing means whereby the opening is closed by the indicating dial and at the same time providing means whereby said dial can be adjusted so that its outer face will rest against the outer face of the wall or tiling and whereby any slight variation in the setting of the valve within the recess can be compensated for, by the adjusting of the dial in or out.

A further object of my invention is to provide a valve of this character in which both the hot and cold water valves, the discharge pipes and the inlet pipe are so connected to a casing that a smaller casing can be provided, thus reducing the cost of manufacture of the valve, and at the same time providing a simple, cheap and effective valve having certain details of structure and combination of parts hereinafter more fully set forth.

In the accompanying drawings:—

Figure 1 is a horizontal view of my improved valve shown in position in the recess of the wall.

Figure 2 is a side elevation showing a dial and operating lever removed.

Figure 3 is a plan view of the dial and operating lever having indicated thereon the different points when cold, warm or hot water is drawn.

Referring now to the drawings, 1 represents the housing which as shown, is provided at its rear end with the vertically disposed cylindrical portions 2 and 3, at the lower end of which are connected the hot water supply pipe 4 and the cold water supply pipe 5. The casing 1, between the members 2 and 3, is provided with a space 6 communicating with the hot and cold water supply as hereinafter more fully described, and connected to the upper end of this space 6 is a discharge pipe 7 which leads upwardly and supplies the cold, warm and hot water to the shower.

In modern plumbing, these valves are placed within a recess in the wall and as shown, this recess is indicated at 8. While I will show and describe my improved valve as applied for use in showers, it will be understood that the same could be used for any other purpose without departing from my invention.

In mounting these valves in recesses for showers, the plumbers often vary the distance between the hot and cold water supply pipes 4 and 5 and the outer face 9 of the wall, and by so doing it has been found difficult to provide a neat closure closely fitting the wall.

In my improved construction the casing 1 is provided with a movable casing 10 closely fitting the outer wall thereof and curved outwardly as indicated at 11, and adjustably held on the casing 1 by set screws 12 and 13. The outer end of the casing 10 is provided with ears 14 having screw threaded recesses therein adapted to receive the screws 15 and 16 which pass through the dial 17 and firmly hold the dial 17 thereto. By this structure it will be seen, should the casing 1 be set by the plumber a greater or less distance from the outer wall 9, the casing 10 can be adjusted inwardly or outwardly on the casing 1, and firmly held in its adjusted position so that the dial 17 will have its inner face closely fitting the outer wall 9. It is understood that this adjustment is made before the dial is applied.

The casing 1 is provided with a central solid portion 18 internally threaded as indicated at 19, and into which is screwed the valve operating member 20. This member 20, as shown, is of a cylindrical form and provided at its outer end with the reduced portion 21, having a rounded shoulder 22 for the purpose presently described. The casing 1, on each side of the solid portion 18, is provided with a cylindrical valve, entering cylindrical spaces 23 and 24 having valve seats 25 and 26 at their outer ends surrounding passages 27 and 28, communicating with the hot and cold water supply spaces 2 and 3. Within the space 23 is the hot water valve 29, having the washer 30 on its inner end co-operating with the seat 25. Secured to the valve 29 by a screw or any other means is a plug 31 which completely closes the passage 27 leading to the hot water space 2. The valve 29 is provided with a valve stem 32, extending outwardly through a stuffing box 33, carried by the cylindrical portion 23 of the casing 1. The outer end of the valve stem 32 beyond the stuffing box, is provided with a reduced portion 34 having a screw threaded end 35.

Within the cylindrical space 24 is the cold water valve 36 which carries the washer 37, co-operating with the valve seat 26. Secured on the end of the valve 36, by a screw or other means, is a plug 38 which is of a diameter to completely close the passage 28, and said plug is provided on opposite sides with the cut away portions 39 and 40 intermediate its ends, leaving the enlarged solid portion 41 at its inner end. The valve 36 is provided with a valve stem 42 extending outwardly through a stuffing box 43, carried by the outer end of the cylindrical space 24, whereby a tight joint is provided with the valve stem. The outer end of the valve stem 42 is reduced as indicated at 44, and has its outer end screw threaded as indicated at 45. The stem 21 has a reduced extension 46 which extends outwardly through the dial 17. Surrounding the reduced portion 46 is an elongated plate 47 which has an enlarged portion 48 having its inner face provided with a concaved groove 49 adapted to bear against the rounded shoulder 22 of the valve operating mechanism. The outer face of the enlarged portion is convexed at 50, and carried by the extension 46 is a plate or nut 51 having its inner face concaved at 52 and bearing against the convexed surface 50 whereby a ball joint connection is provided between the member 20 and the plate 47, whereby any variation in the alinement of the valve stems 32 and 42, and valve operating member 20 is compensated for.

The plate 47 at its outer ends is provided with openings 53 and 54 of a size greater than that of the reduced portions 34 and 44 of the valve stems 32 and 42. On the reduced portions 34 and 44 of the valve stems, on each side of the plate are washers 55 and 56, and nuts 57 and 58 are screwed on the valve stems for holding the plate 47 on the valve stems, yet allowing the slight movement of the valves independent of the plate 47.

The valve operating member 20 is provided with a cylindrical extension 59 which extends out through the opening 60 in the casing 1, and which forms a guide. This extension is threaded as indicated at 61 and upon it is threaded the nut 62, whereby outward movement of the valve operating member is limited, providing a simple regulator for limiting the movement of the pointer, which I will now proceed to describe.

The member 21 extends outwardly through an opening 63 in the dial 17, and secured thereon on the outside of the dial is the operating lever 64 having the pointer 65. The dial as shown, has markings thereon to indicate how the valves are set, so that the pointer 65 will readily indicate the position of the valves, so the operator will know what kind of water is being drawn.

Figure 1 of the drawings shows the valve closed, and the pointer 65 would be pointing at the point on the dial indicated by the words "Shut off". Turning the lever 64 so that the pointer 65 would point to the word "Cold", would cause the member 20 to move outwardly, due to the pitch of the threads thereon, and would move the plate 47 outwardly which in turn would move the two valves 29 and 36 outwardly and bring the washers 30 and 37 from engagement with the valve seats 25 and 26. The member 38 carried by the cold water valve 36 would move sufficiently far through the opening 28 to allow the cold water to pass through the cut away portions 39 and 40 into the passage 6. The hot water valve 30, as herebefore stated, would also move outwardly, but the plug 31 would remain in such a position that the opening 27 would be closed. The continued movement of the operating lever 64 would move the hot water valve to a position such that the plug 31 would not obstruct the passage 27 and hot water would enter. The plug 38 has by this time moved a sufficient distance outwardly to partially close the passages 39 and 40 therein, and thus both hot and cold water would be passing into the passage 6, and warm water would be passing from the pipe 7. The continued movement of the operating lever, so that the pointer would be opposite the word "Hot" on the dial, would cause the plug 31 to move outwardly so that it would be entirely out of the passage 27 and the plug 38 would then be in a position so that the solid portion 41 would be wholly within the passage 28 and the cold water entirely cut off, and the hot water would be discharged from the pipe 7.

From the description it will be seen that in operating the valves it is first necessary to admit cold water, then warm water and then hot water to the space 6, and thus the liability of scalding is greatly reduced. By having the space 6 above the guide 59, the mixing of the hot and cold water is improved on account of an upward mixing discharge.

Having thus fully described my invention what I claim is:

1. A mixing valve comprising a casing having a hot water inlet and a cold water inlet, an outlet communicating therewith, separate valves controlling the supply of water from the hot and cold water inlets to the outlet, a frame adjustably carried by the casing, and a dial carried by the adjustable frame, and a lever operating on said dial for controlling said valves whereby first cold water passes from the outlet and gradually gets hotter as the lever is moved on the dial.

2. A mixing valve comprising a casing having a hot water inlet and a cold water inlet communicating with an outlet, valves controlling the communication between the hot and cold water inlets and the outlet, a member having a threaded connection with the casing intermediate the valves, means for rotating said member and means carried by the screw threaded member and operating the valves whereby cold water is first discharged from the outlet and on the continued movement of the lever the outlet gradually gets warm until hot water is discharged from the outlet.

3. A mixing valve comprising a casing having a hot water and a cold water inlet communicating with an outlet, valves controlling the communication between the hot and cold water inlets and the outlet, a member having a threaded connection with the casing intermediate the valves, a lever for turning said member within the casing, an elongated plate carried by the threaded member and connected to the valves whereby the rotation of the threaded member opens and closes the valve.

4. A mixing valve comprising a casing having a hot water inlet and a cold water inlet, and an outlet intermediate the same and communicating therewith, valves controlling the communications between the hot water inlet and the cold water inlet and the outlet, a member screwed into the casing between the valves, a plate loosely mounted upon the outer end of the threaded member and connected to the valve stems, and a lever connected to the extreme outer end of the threaded member whereby the rotary movement of the lever causes the valves to simultaneously unseat.

5. A mixing valve comprising a casing having hot and cold water inlets, and an outlet intermediate the same and in communication therewith, reciprocating valves closing the communication between the hot and cold water inlets and the outlet, stuffing boxes surrounding the valve stem, an oscillating member carried by the casing intermediate the valves, a frame adjustably mounted on the casing, a dial removably carried by the frame, an operating lever carried by the oscillating member on the outside of the dial, and an arm loosely mounted on the oscillating member and adapted to reciprocate the valves for simultaneously seating and unseating the same.

6. A mixing valve comprising a casing having a hot water inlet and a cold water inlet, communicating with an outlet, valves controlling the communication between the hot and cold water inlets and the outlet, a threaded member carried by the casing intermediate the valves, a guide carried by said member and extending through the casing, means for rotating said member, and means carried by the screw threaded member for operating the valves, whereby cold water is first discharged from the outlet, and the continued movement thereof gradually opens the outlet until warm and then hot water is discharged from the outlet.

7. A mixing valve comprising a casing having a hot water inlet and a cold water inlet, communicating with an outlet, valves controlling the communication between the hot and cold water inlets and the outlet, a threaded member carried by a casing intermediate the valves, a guide carried by the threaded member and extending through the casing, a stop nut adjustable on the guide on the outside of the casing, means for rotating said member, and means carried by the screw threaded member and operating the valves.

8. A mixing valve comprising a casing having hot and cold water inlets communicating with an outlet, valves controlling the communication between the hot and cold water inlets, and the outlet, a threaded member carried by the casing intermediate the valves, a lever for turning said threaded member, an elongated plate carried by and having a ball joint with the threaded member and having its ends connected to the valves, whereby rotation of the threaded member opens and closes the valves.

9. A mixing valve comprising a casing having a hot water inlet and a cold water inlet, an outlet intermediate the same and communicating therewith, valves controlling the communication between the hot water inlet and the cold water inlet and the outlet, a member screwed into the casing between the valves, a plate loosely mounted upon the outer end of the threaded member and having a rocking movement thereon and having its outer ends loosely connected to the valves, and means for actuating said threaded member.

10. A mixing valve comprising a casing having a hot water inlet and a cold water inlet, and an outlet intermediate the same and communicating therewith, valves controlling the communication between the hot water inlet and the cold water inlet and the outlet, a member screwed in the casing between the valves, a plate loosely mounted upon the threaded member and having a rocking movement thereon and extending outwardly and having openings through which the valve stems loosely pass, and means for loosely securing the valve stems to the plate.

11. A mixing valve comprising a casing having a hot water inlet and a cold water inlet, and an outlet, valves controlling the communication between the hot water inlet and the cold water inlet and the outlet, a member screwed into the casing, a plate loosely mounted near the outer end of the threaded member and having a rocking movement thereon, and having its outer ends provided with a rocking connection with the valves, and means for adjusting said threaded member.

12. A mixing valve comprising a casing, having a hot water inlet, a cold water inlet and an outlet, valves controlling the communication between the hot water inlet and the cold water inlet and the outlet, and constructed to first allow cold water to pass from the outlet and a continued movement of the valves allowing the water to become gradually warm and then hot, a member screwed in the casing between the valves, a plate loosely mounted upon the threaded member and adapted to have a rocking movement thereon and extending outwardly and having openings through which the valve stems pass, and said valves having a rocking connection with the plate, and means for operating said valve stem.

In testimony whereof, I have signed this specification.

EDWARD L. DELANY.